No. 687,313. Patented Nov. 26, 1901.
R. B. HULME.
FILTER PRESS.
(Application filed Jan. 21, 1901.)
(No Model.) 4 Sheets—Sheet 1.
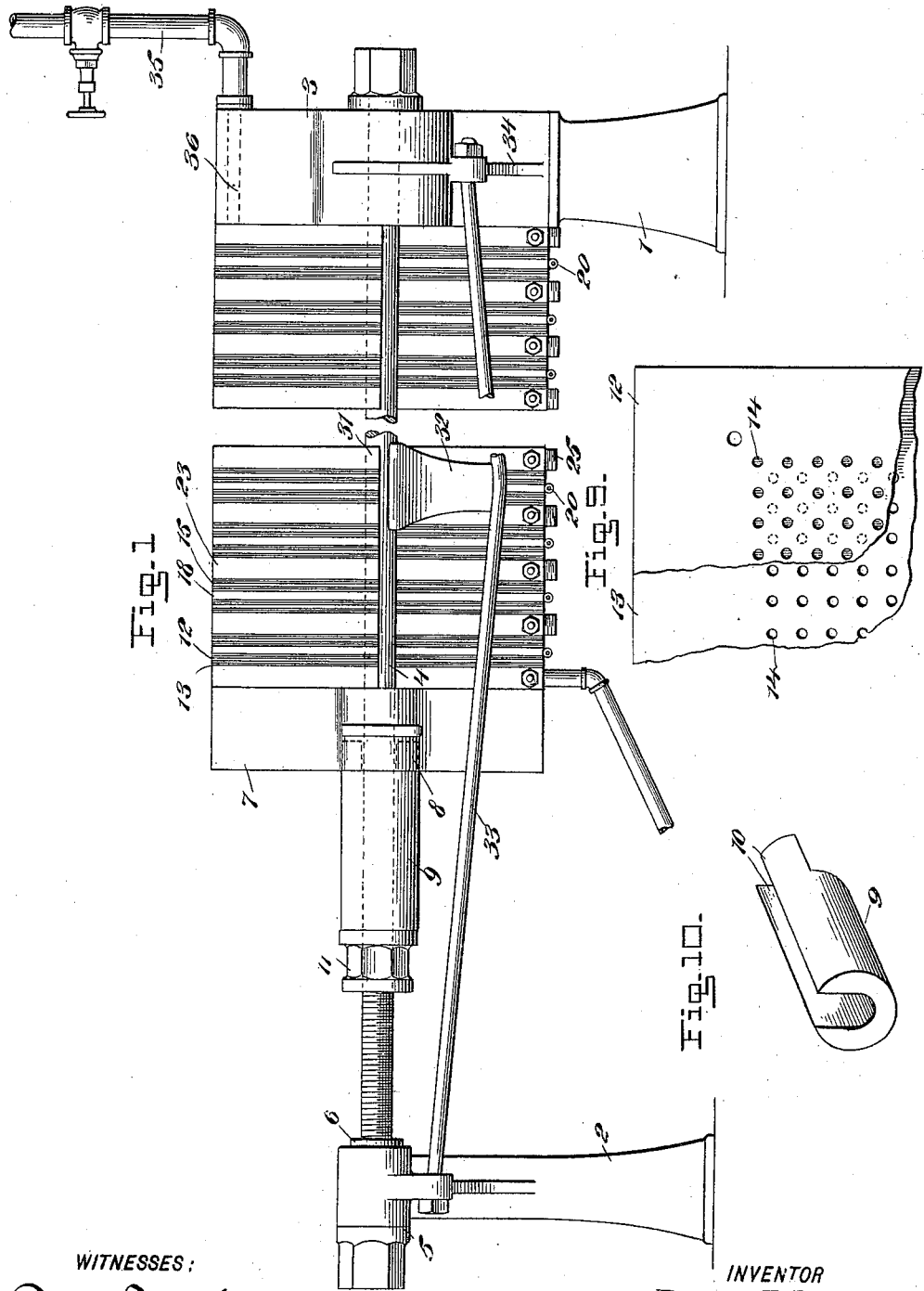
WITNESSES:
INVENTOR
Robert B. Hulme
BY
ATTORNEYS No. 687,313. Patented Nov. 26, 1901.
R. B. HULME.
FILTER PRESS.
(Application filed Jan. 21, 1901.)
(No Model.) 4 Sheets—Sheet 2.
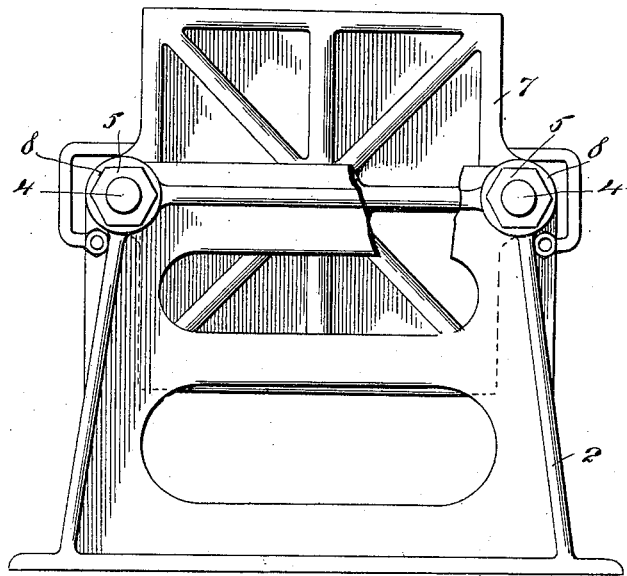
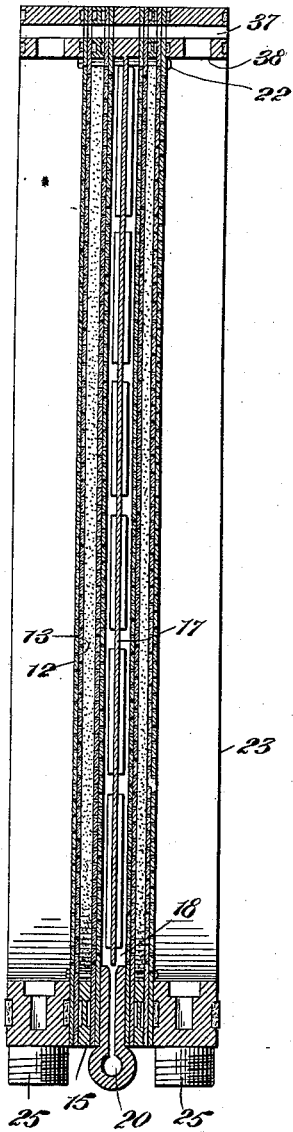
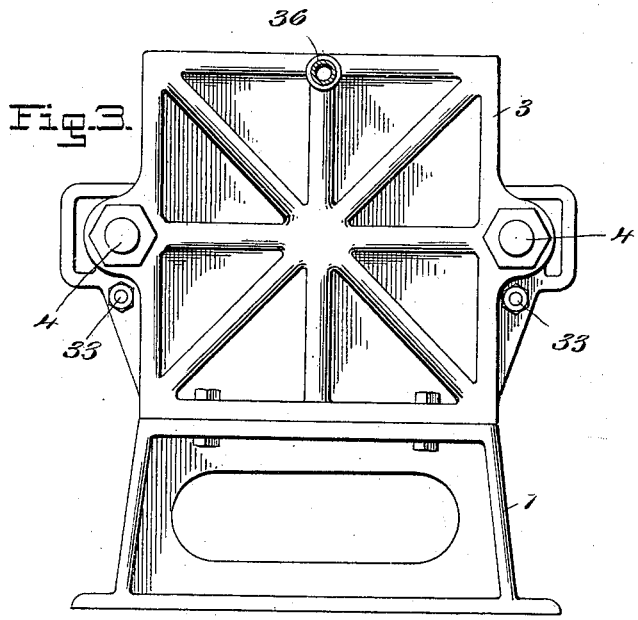
WITNESSES:
INVENTOR
Robert B. Hulme
BY
ATTORNEYS No. 687,313. Patented Nov. 26, 1901.
R. B. HULME.
FILTER PRESS.
(Application filed Jan. 21, 1901.)
(No Model.) 4 Sheets—Sheet 3.
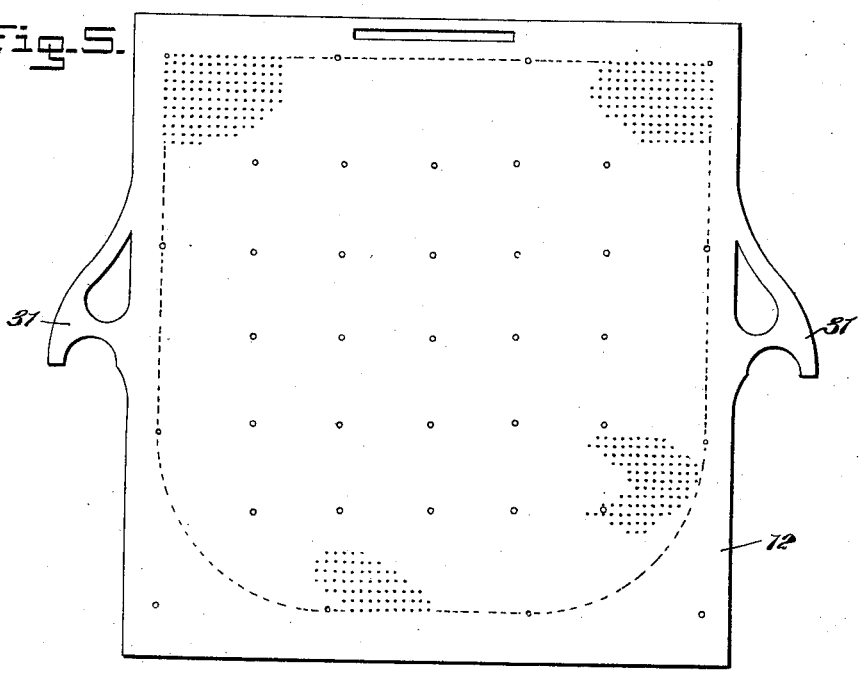
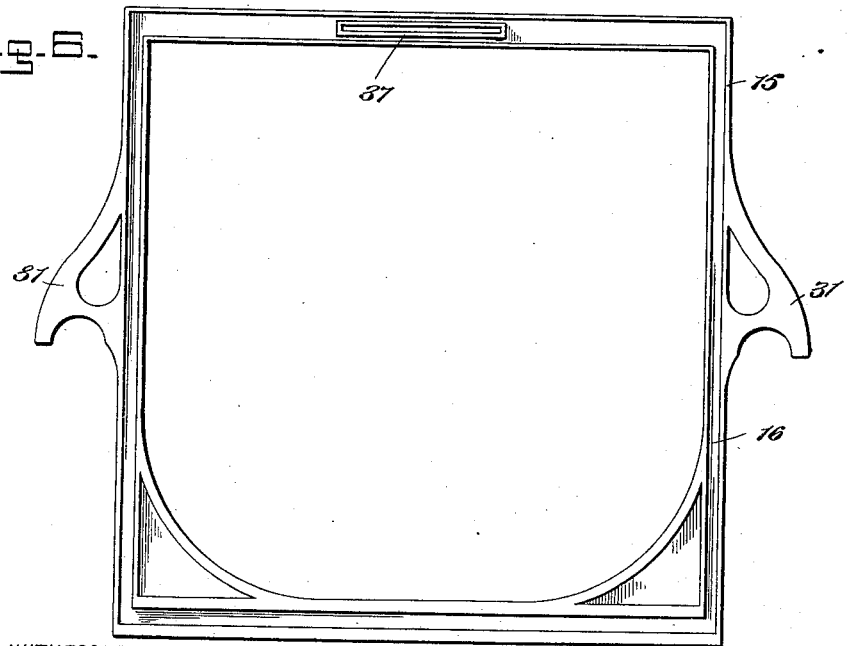
WITNESSES:
INVENTOR
Robert B. Hulme
BY
ATTORNEYS No. 687,313. Patented Nov. 26, 1901.
R. B. HULME.
FILTER PRESS.
(Application filed Jan. 21, 1901.)
(No Model.) 4 Sheets—Sheet 4.
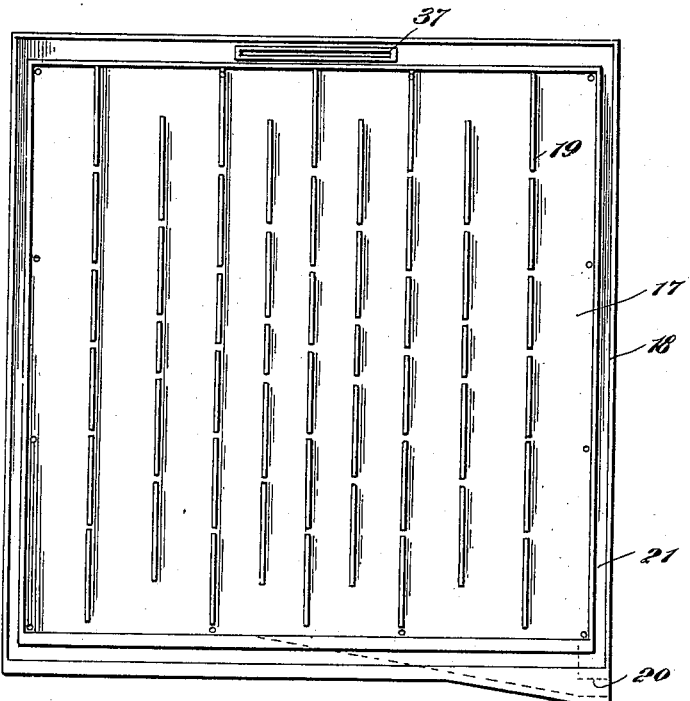
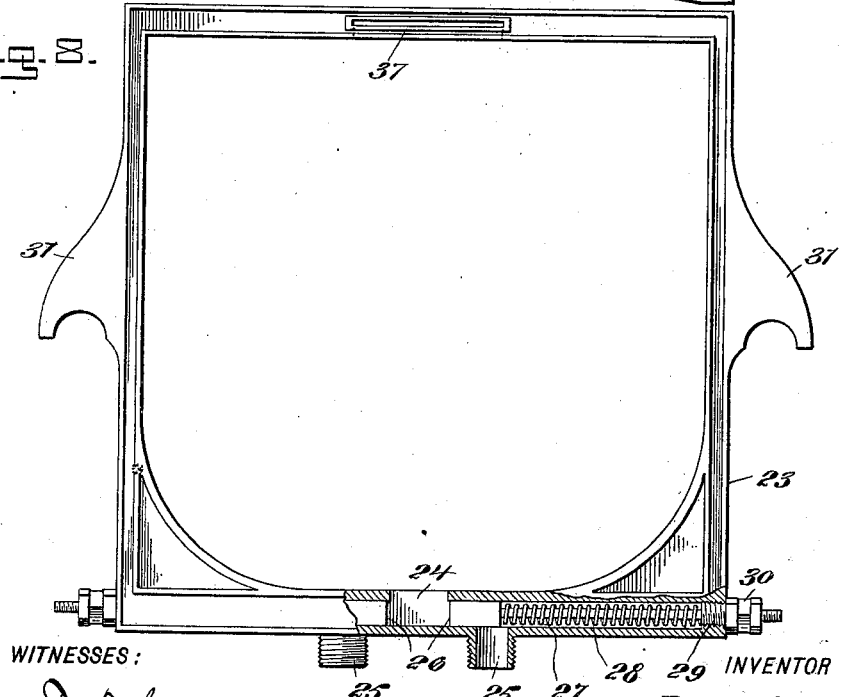
WITNESSES:
INVENTOR
Robert B. Hulme
BY
ATTORNEYS

UNITED STATES PATENT OFFICE.

ROBERT B. HULME, OF LOUISVILLE, KENTUCKY.

FILTER-PRESS.

SPECIFICATION forming part of Letters Patent No. 687,313, dated November 26, 1901.

Application filed January 21, 1901. Serial No. 44,096. (No model.)

*To all whom it may concern:*

Be it known that I, ROBERT B. HULME, a citizen of the United States, and a resident of Louisville, in the county of Jefferson and State of Kentucky, have invented a new and Improved Filter-Press, of which the following is a full, clear, and exact description.

This invention relates to improvements in machines for filtering water or other liquids received under pressure; and the object is to provide a device of this character by means of which liquid may be rapidly and thoroughly filtered, the device being particularly adapted for distributing systems receiving liquids or substance from a reservoir.

I will describe a filter-press embodying my invention and then point out the novel features in the appended claims.

Reference is to be had to the accompanying drawings, forming a part of this specification, in which similar characters of reference indicate corresponding parts in all the figures.

Figure 1 is a side elevation of a filter-press embodying my invention. Figs. 2 and 3 are opposite end elevations. Fig. 4 is a section showing the arrangement of the filtering-plates. Fig. 5 is a face view of one of the filtering-plates. Fig. 6 shows a spacing-frame placed between adjacent pairs of plates. Fig. 7 shows a pressure-receiving plate. Fig. 8 shows a receiving-chamber frame. Fig. 9 is a fragment showing a pair of plates as connected, and Fig. 10 is a perspective view of one of two washers or sleeves employed.

The frame of the machine comprises end standards 1 and 2. Supported rigidly on the end standard 1 is a head plate or block 3, and extended from the opposite sides of the head-block 3 to the standard 2 are supporting-rods 4. These supporting-rods at the end extended through the standard 2 are screw-threaded, and engaging with the threads on the outer side of the standard 2 are adjusting-nuts 5, and engaging with said rods at the inner side of the standard 2 are jam-nuts 6.

Supported by and movable longitudinally of the rods 4 is a clamping-head 7. This clamping-head has outwardly-projecting side pieces 8, through perforations in which the rods 4 pass. Sleeves or long washers 9 are placed upon the rods 4 between the head 7 and the clamping-nuts 11 on the threaded portions of said rods. For convenience in placing or removing the sleeves they are opened outward, as shown in Fig. 10, so as to pass over the rods, and projections 10 on the ends are designed to engage opposite sides of ribs on the head to prevent their working off to one side.

Clamped between the heads 3 and 7 are a series of filtering-plates and holding and spacing devices therefor. The filtering-plates are arranged in pairs pressed closely together, as indicated by 12 and 13, and each plate is provided with a number of perforations 14. The perforations of one plate are staggered with relation to the perforations of the other plate, or, in other words, the perforations of one plate are arranged out of line with the perforations of the other plate, so that liquid in passing through the perforations of one plate will be compelled to spread out between the plates before passing through the perforations of the other plate.

Arranged between adjacent pairs of filtering-plates is a spacing-frame 15. The space in this frame is to be filled in with a filter mass, such as charcoal, asbestos, &c., or any material of a nature to suit the condition of the liquid or substance being filtered. The frame at its opposite sides is provided with channels 16 to receive a packing—such, for instance, as rubber—which will engage closely against the surfaces of the filtering-plates. Arranged between each double pair of plates is a spacing or baffle plate 17, arranged in a frame 18, and on opposite sides of the plate 17 are blocks or strips 19, which when undue pressure occurs in the filter will engage against filtering-plates and prevent them from becoming displaced or forced toward each other. These several blocks or strips 19 are separated one from another, so that liquid may pass freely between them.

Formed in the lower portion of the frame 18 is a discharge-port 20 for the filtered liquid. These several discharge-ports 20 lead out to one side of the machine, as clearly indicated in Fig. 7. The frame 18 is also provided on its opposite sides with channels 21 to receive a packing. The filtering-plates, the frame 15, and the plate 17 are secured together by means of bolts 22.

Arranged between each set of four pairs of plates is a frame 23, which forms the walls of a receiving-chamber for liquid or substance to be filtered. In its lower portion each frame 23 has an outlet 24, designed to be placed in communication with outlet-nipples 25. The outlet is controlled by valve-blocks 26, movable over the inner ends of the nipples 25 and normally pressed to their closing position by springs 27, which surround the stems 28, bearing at one end against the blocks and at the other end against a tubular nut 29, through which the stem is free to move. The tension of the spring may be regulated by a nut 30 on the outer end of the stem 28.

In filtering a heavy material from a liquid—for instance, sand from water—the mixture is to be pumped through the pipe 35, finding its way into the frames 23. The water will be forced through the plates 12 and 13, discharging through 17 at 20. The sand will gather in the frames 23, increasing in density as mixture is pumped in. The pressure will also increase proportionately and at a fixed pressure. The valve-blocks 26 will be forced back, allowing the dry sand to discharge through the nipples. As sand is discharged more mixture finds its way in from above, thereby maintaining a steady pressure on the filter-press.

The filtering-plates, the frames 15, and the frames 23 are provided at their opposite sides with lugs 31, having semicircular notches on the under side for engaging over the rods 4, so that the said parts will be supported by the rods. The rods 4 are prevented from downward movement or deflection by supporting-blocks 32, mounted on tie-rods 33, extended upward and connected to the standards 1 and 2, or, as shown in Fig. 1, one end of said tie-rods may be connected to wings 34 on the head-block 3. As shown in Fig. 1, there will be several pairs of filtering-plates and several frames, as above described, arranged between the heads 3 and 7.

The liquid to be filtered is received from a pipe 35, communicating with a port 36 in the upper portion of the head 3, and this port communicates with ports 37, leading through the several frames 23, the several frames 18, the several frames 15, and the upper portions of the filtering-plates. From the ports 37, leading through the upper portions of the frames 23, ports 38 lead into the chambers formed by said frames. It will be seen that the frames 23 are channeled on their opposite sides to receive packing material. When the several devices are arranged between the heads 3 and 7, the clamping-nuts 11 are to be turned to clamp said several parts closely together.

In operation the liquid or substance to be filtered in flowing through the ports 37 will pass downward into the chambers formed by the frames 23 and the liquid contained therein will percolate through the perforations of the filtering-plates and discharge through the outlets 20. The several outlets may lead to a common reservoir. The sediment will gather in the lower portions of the receiving-chambers and will be let out when free from liquid through 25.

By using the washers 9, as shown, the nuts 11 need be slacked off but a very little to release the pressure, so that the washers may be removed when it is desired to remove plates for cleaning or other purpose.

Having thus described my invention, I claim as new and desire to secure by Letters Patent—

1. A filter-press, comprising perforated filtering-plates arranged in pairs, the perforations of one plate of a pair being staggered with relation to the perforations of the other plate, spacing-frames arranged between pairs of filtering-plates, pressure-receiving plates arranged between each double pair of filtering-plates, the said pressure-receiving plates having outlets, and receiving-chambers arranged between pairs of perforated plates, substantially as specified.

2. A filter-press, consisting of a frame comprising standards, a fixed head-block on one of said standards, supporting-rods extended from the other of said standards to the head-block, a clamping head or block movable on said rods, clamping-nuts on the rods, sleeves on the rods between the nuts and movable head, the said sleeves being open at one side and filtering devices supported between the two heads, substantially as specified.

3. In a filter-press, a series of perforated plates arranged in pairs placed closely together, pressure-plates arranged between pairs of perforated plates and having blocks or strips for engaging with the perforated plates, the said pressure-plates having outlets at the lower sides, receiving-chambers arranged between perforated plates and having outlets at the lower sides, pressure-actuated valves for controlling said outlets, and means for supplying substance to said chambers, substantially as specified.

4. A filter-press, comprising a series of perforated plates, frames forming the walls of receiving-chambers arranged between plates, means for supplying substance thereto, discharge-ports leading from said chambers, means for automatically controlling said discharge-ports, pressure-plates arranged between perforated plates and having outlets for filtered liquid, and means for pressing said perforated plates and the frame together, substantially as specified.

In testimony whereof I have signed my name to this specification in the presence of two subscribing witnesses.

ROBERT B. HULME.

Witnesses:
R. C. WAGGENER,
E. B. MARTIN.